United States Patent [19]

Kumano et al.

[11] Patent Number: 4,821,230
[45] Date of Patent: Apr. 11, 1989

[54] MACHINE TRANSLATION SYSTEM

[75] Inventors: Akira Kumano; Hiroyasu Nogami; Seiji Miike; Shin-ya Amano, all of Yokohama, Japan

[73] Assignee: Kabushiki Kaisha Toshiba, Kawasaki, Japan

[21] Appl. No.: 133

[22] Filed: Jan. 2, 1987

[30] Foreign Application Priority Data

Jan. 14, 1986 [JP] Japan .................................. 61-5570

[51] Int. Cl.⁴ ............................................ G06F 15/38
[52] U.S. Cl. .................................... 364/900; 364/419
[58] Field of Search ... 364/200 MS File, 900 MS File, 364/419

[56] References Cited

U.S. PATENT DOCUMENTS

| 4,417,319 | 11/1983 | Morimoto et al. | 364/900 |
| 4,502,128 | 2/1985 | Okajima et al. | 364/900 |
| 4,586,160 | 4/1986 | Amano et al. | 364/900 |
| 4,641,264 | 2/1987 | Nitta et al. | 364/900 |

FOREIGN PATENT DOCUMENTS

0138619  4/1985  European Pat. Off. .
60-201467 10/1985 Japan .

Primary Examiner—Thomas M. Heckler
Attorney, Agent, or Firm—Oblon, Fisher, Spivak, McClelland & Maier

[57] ABSTRACT

A machine translation system has an input unit for inputting an original sentence, a dictionary section for storing language information used in translation processing, a translation processor for translation-processing the original sentence with reference to the language information stored in the dictionary section, and an output unit for outputting a translated sentence obtained by the translation processor. The translation processor has an analysis section, a translated sentence generation section, and a punctuation mark generation section. The analysis section analyzes the original sentence. The translated sentence generation section generates the translated sentence in accordance with the analysis result of the analysis section. The punctuation mark generation section generates a punctuation mark substantially independently of a punctuation mark present in the original sentence, and appropriately inserts it in the translated sentence.

10 Claims, 9 Drawing Sheets

| CONNECTION BETWEEN MAIN AND SUBORDINATE CLAUSES | CONNECTION BETWEEN IMPERATIVE AND DECLARATIVE CLAUSES |
|---|---|
| (1) GENERATE SUBORDINATE CLAUSE<br><br>(2) REPRODUCE SUBORDINATE CONJUNCTION<br><br>(3) GENERATE COMMA "、"<br><br>(4) GENERATE MAIN CLAUSE<br><br>(5) GENERATE PERIOD "。" | (1) GENERATE IMPERATIVE SENTENCE<br><br>(2) GENERATE PERIOD "。"<br><br>(3) REPRODUCE COORDINATE CONJUNCTION<br><br>(4) GENERATE COMMA "、"<br><br>(5) GENERATE DECLARATIVE SENTENCE<br><br>(6) GENERATE PERIOD "。" |

F I G. 10

FIG. 11A  I know he killed my mother.

FIG. 12A  I hate a man who killed my mother.

MACHINE TRANSLATION SYSTEM

BACKGROUND OF THE INVENTION

The present invention relates to a machine translation system for processing an original sentence to obtain a translated sentence and, more particularly, to a machine translation system which can improve translation efficiency and can obtain a more natural-sounding translated sentence.

In recent years, various machine translation systems which perform translation by using a computer, e.g., a processing system for translating English sentences into Japanese sentences or a processing system for translating Japanese sentences into English sentences, have been developed.

Basic processing in a conventional machine translation system will be briefly described.

(1) Morphological, syntactic, and semantic analyses are performed for a given original sentence, and the original sentence is divided into predetermined processing units, e.g., words (or phrases).

(2) A dictionary (translation dictionary) as a data base of language information necessary for translation processing is searched to obtain translated words (or translated phrases) in the processing units of the original sentence.

(3) These translated words (translated phrases) are connected according to predetermined syntactic rules for translated sentence generation, thus generating a translated sentence of the original sentence.

However, a technique for interpreting verbal meanings in a natural language has not yet been established. For this reason, it is difficult to immediately obtain an appropriate translated sentence through the above-mentioned machine translation. Furthermore, since there are an infinite number of sentences that can be expressed with words and phases in the original language, it is not always possible for machines to generate appropriately natural-sounding translated sentences of all of these original sentences.

In the conventional machine translation system, a translated sentence is provided with punctuation marks in correspondence with punctuation marks present in an original sentence in order to obtain a sentence which is at least easy to read. More specifically, the punctuation marks in the original sentence are directly transferred to the corresponding punctuation marks or words, and are arranged at positions in the translated sentence corresponding to those in the original sentence. (When translated sentences have no punctuation marks corresponding to those in an original sentence, the punctuation marks in the original sentence are often replaced with proper words corresponding to the meanings of the punctuation marks in the original sentence in some languages.)

However, if original and translated sentences are different from each other in terms of their syntactic structures, it is often difficult to determine positions of punctuation marks in a translated sentence corresponding to the punctuation marks in an original sentence. Some languages are expressed with almost no punctuation marks, and some are difficult to understand unless many punctuation marks are used.

Even if a translated sentence is simply marked off by punctuation marks in correspondence with those in an original sentence, a natural-sounding translated sentence which is easy to read cannot often be obtained.

SUMMARY OF THE INVENTION

It is an object of the present invention to provide a machine translation system which can appropriately provide a translated sentence with punctuation marks (regardless of the presence, absence, or positions of punctuation marks in the original sentence), and can conveniently obtain a natural-sounding translated sentence which is easy to read.

A machine translation system according to the present invention translates original sentences input from an input unit, using language information stored in a dictionary section, to obtain translated sentences. In this system, when the original sentences are analyzed to obtain the translated sentences, appropriate punctuation marks are generated substantially independently of those present in the original sentences in accordance with the structure of the original and/or translated sentences, and are appropriately provided to the translated sentences. For example, if one sentence of the original sentences has a conjunction or modification relationship which can be divided into a plurality of sentences, appropriate punctuation marks are generated for a translated sentence according to the conjunction or modification relationship, and are inserted at positions corresponding to the conjunction or modification relationship of the translated sentence, thus completing the translated sentence. When a sentence or phrase which serves as a semantic unit is detected from a phrase string of the translated sentence, a punctuation mark is inserted between the sentence or phrase and other portions.

According to the machine translation system of the present invention, punctuation marks which are appropriate in terms of expression of a translated sentence are provided to a generated translated sentence on the basis of the syntactic structure of the translated sentence. Therefore, a natural-sounding translated sentence which is easy to read and has appropriate punctuation marks can be obtained.

Therefore, according to this system, machine translation between languages whose syntactic structures are largely different from each other can be performed.

DETAILED DESCRIPTION OF THE PREFERRED EMBODIMENT

A machine translation system according to an embodiment of the present invention will now be described with reference to the accompanying drawings.

Figure 1:
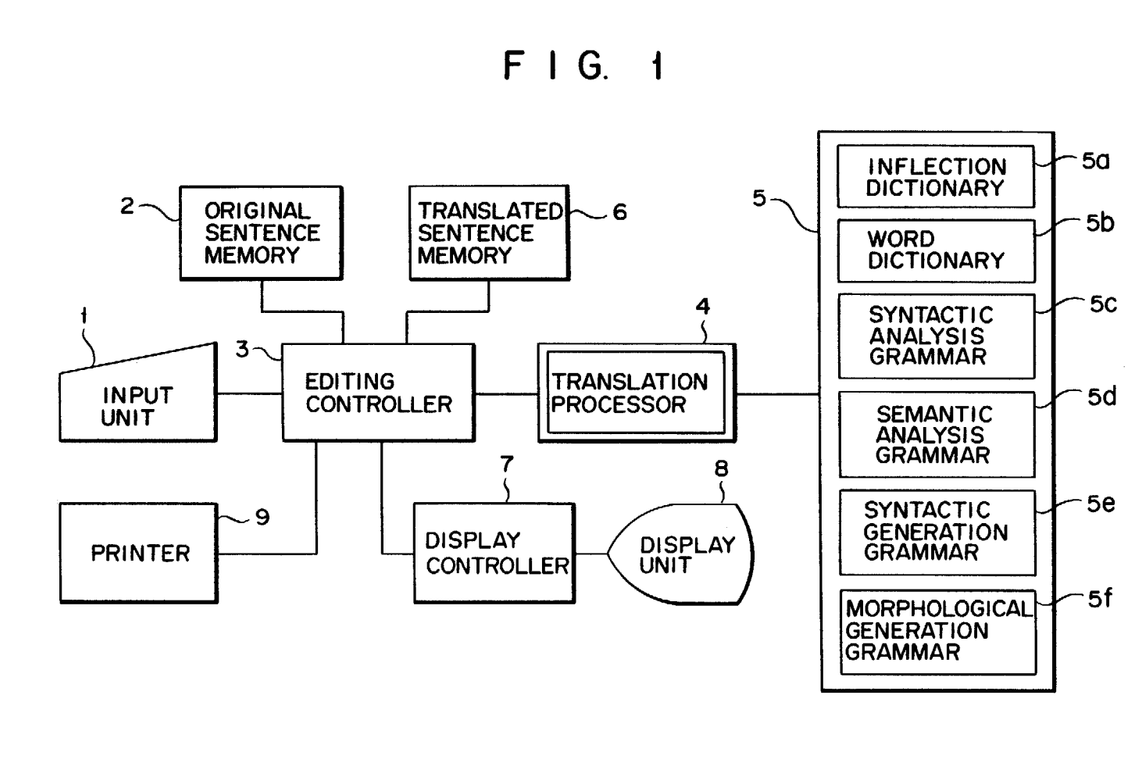
FIG. 1 is a block diagram showing the arrangement of a machine translation system according to an embodiment of the present invention.

In the system of this embodiment, an English sentence is input, and is machine-translated into a Japanese sentence. FIG. 1 shows the schematic arrangement of this system.

The machine translation system of this embodiment comprises input unit 1, original sentence memory 2, editing controller 3, translation processor 4, dictionary section 5, translated sentence memory 6, display controller 7, display unit 8, and printer 9. Input unit 1 inputs English sentences as original sentences and other information, and includes a keyboard or the like for allowing an operator to input information. An English sentence (including punctuation marks and spaces), constituted by character string information input through input unit 1, is an original sentence to be subjected to translation processing, and is stored in original sentence memory 2.

Translation processor 4 is operated under the control of editing controller 3, and translates the original sentence. More specifically, in the translation processing of processor 4, dictionary section 5, which prestores language information necessary for the translation processing, is searched, so that the original sentence stored in memory 2 is sequentially translated in predetermined processing units. A translated sentence (in this case, a Japanese sentence) obtained from processor 4 is stored in translated sentence memory 6 such that the corresponding original sentence can be designated for each of the predetermined processing units.

Language information prestored in dictionary section 5 includes, for example, inflection dictionary 5a, (translated) word dictionary 5b, syntactic analysis grammar information 5c, semantic analysis grammar information 5d, syntactic generation grammar information 5e, and morphological generation grammar information 5f. Inflection dictionary 5a consists of information for obtaining a root (or a fundamental form) of a regular or irregular inflection form of an inflective word, that is, information indicating the correspondence between the regular or irregular inflection form of the inflective word and its root. Word dictionary 5b consists of information for obtaining corresponding translated words (or phrases) from words of the language of an original sentence, that is, information indicating the correspondence between words of the language of an original sentence and words or phrases (translated words or phrases) of the language of a translated sentence. Syntactic analysis grammar information 5c is grammar information necessary for syntactic analysis of an original sentence. Semantic analysis grammar information 5d is grammar information necessary for structural transfer from the syntactic structure of original sentence to the syntactic structure of translated sentence. Syntactic generation information 5e is grammar information necessary for generating a syntactic structure of a translated sentence. Morphological generation grammar information 5f is grammar information necessary for generating morphemes of a translated sentence to form the sentence.

Display controller 7, controlled by editing controller 3, simultaneously displays an English sentence (original sentence) stored in memory 2 and a Japanese sentence (translated sentence) stored in memory 6 on display unit 8. Display unit 8 comprises, e.g., a CRT (Cathode Ray Tube) display. Display controller 7 controls unit 8 so that an English sentence and its corresponding Japanese sentence are displayed on the screen of unit 8 in a predetermined arrangement. While original and translated sentences are displayed on unit 8, post-editing processing of the translated sentence is performed. The post-editing processing is performed in accordance with, e.g., control information supplied from input unit 1, and in this processing, language information prestored in dictionary section 5 is looked up as needed.

Note that printer 9 forms a hard copy of a translated sentence (i.e., a Japanese sentence) which is completed by the post-editing processing.

Figure 2:
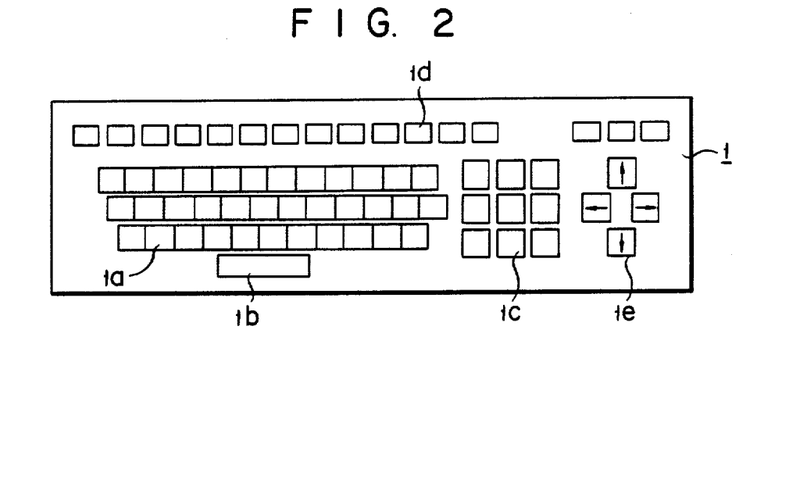
FIG. 2 is an illustration of a keyboard arranged on an input unit in the system shown in FIG. 1.

A keyboard constituting input unit 1 is configured as shown in FIG. 2. The keyboard has, e.g., character data input key group 1a, translation key 1b, editing key group 1c, function key group 1d, and cursor control key group 1e. Cursor control key group 1e consists of a plurality of arrow (or direction) keys for shifting a cursor displayed on display unit 8 in predetermined directions.

Figure 3:
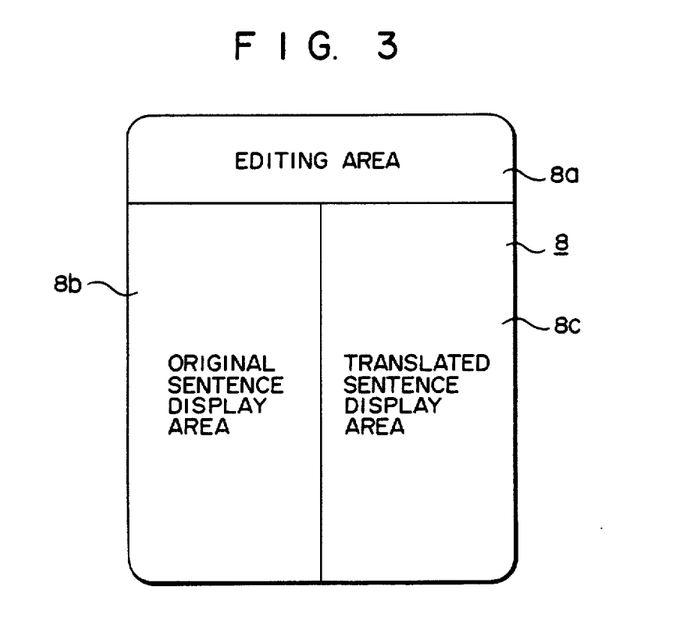
FIG. 3 is a display format of a display unit in the system shown in FIG. 1.

FIG. 3 shows a display format of the display screen of display unit 8. In this case, translation editing area 8a is formed on the upper portion of the display screen, and original sentence display area 8b and translated sentence display area 8c are respectively formed on the left and right portions of the screen.

Original sentence display area 8b divisionally displays an input original sentence (an English sentence) stored in memory 2 in the predetermined processing units, i.e., in units of sentences. Translated sentence display area 8c displays a translated sentence (Japanese sentence) stored in memory 6 in correspondence with the original sentence displayed on area 8b in the processing units. Translation editing area 8a displays language information which is necessary for translation processing and is obtained from dictionary section 5, e.g., a translated sentence possibility and/or other information.

Figure 4:
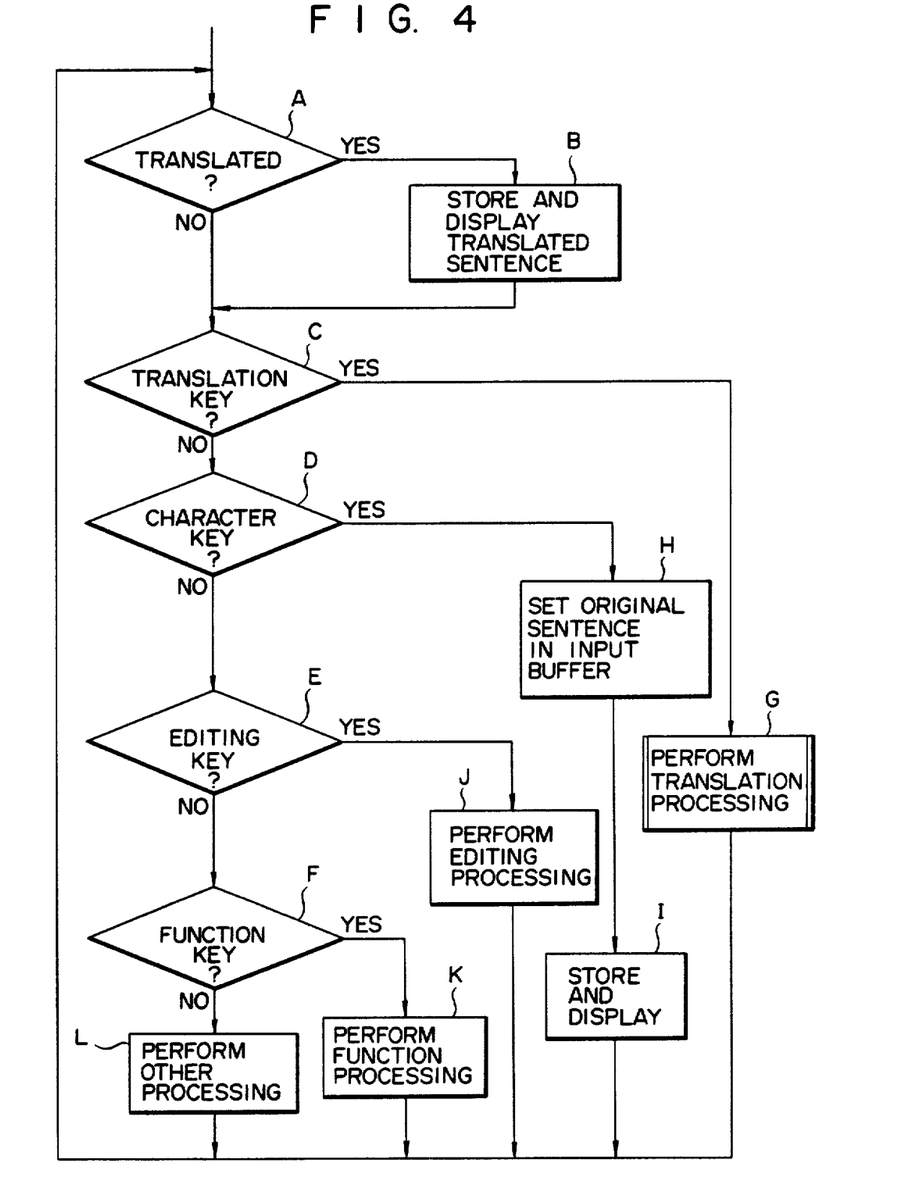
FIG. 4 is a flow chart showing a basic operation sequence in the system shown in FIG. 1.

FIG. 4 shows the basic operation sequence in the system shown in FIGS. 1 to 3.

Editing controller 3 sequentially discriminates translation end information supplied from processor 4 and various key information input from input unit 1 in accordance with the operation sequence shown in FIG. 4, and controls translation and/or editing processing in an interactive manner.

More specifically, editing controller 3 monitors a translation processing state in processor 4 (step A). When processor 4 completes translation processing for one sentence (predetermined processing unit) from the original sentences, processor 4 stores a translated sentence obtained by the translated processing in memory 6, and causes display unit 8 to display the translated sentence (step B).

When no translation end signal is obtained from translation processor 4, and when the translated sentence is stored and displayed, key information supplied from input unit 1 is distinguished (steps C, D, E, and F). In accordance with the distinction result of the key information, the following processing is performed.

If the input key information is "translation key" information (step C), controller 3 reads out one of the original sentences stored in memory 2 and supplies it to processor 4, thus starting translation processing (step G).

Figure 5:
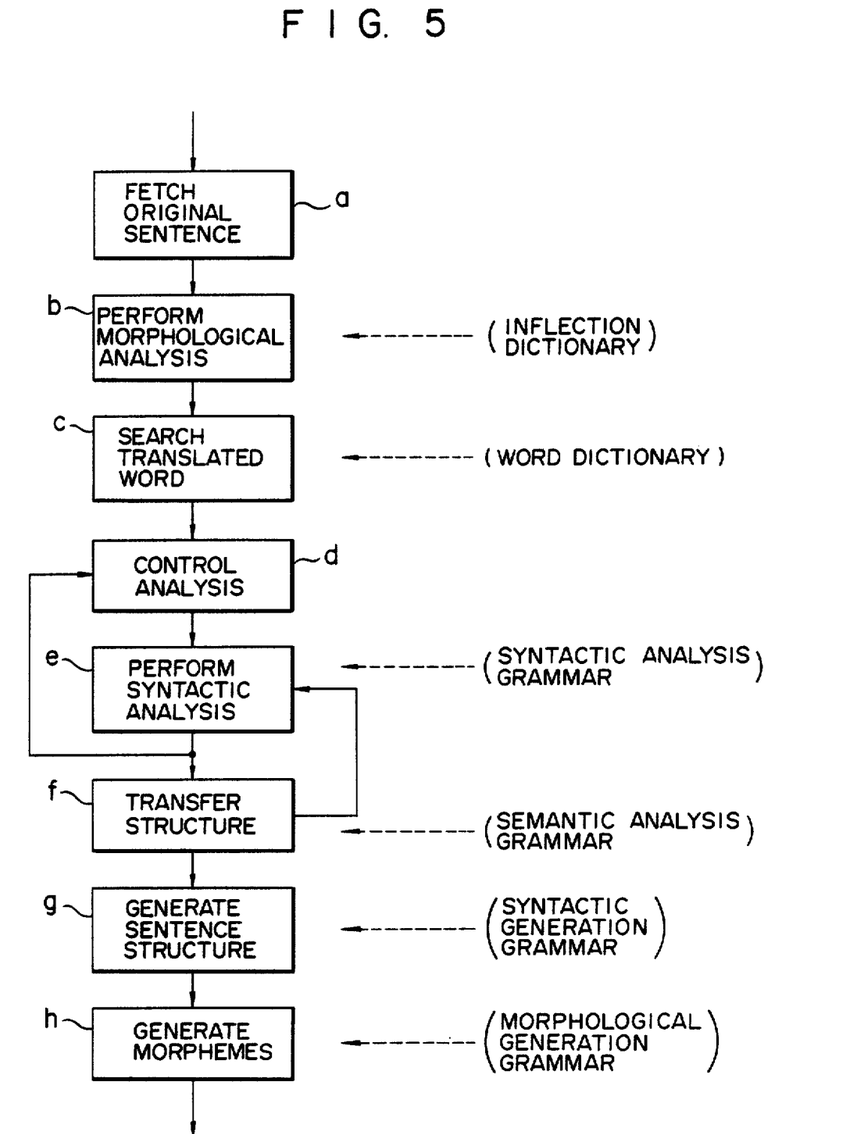
FIG. 5 is a flow chart showing translation processing procedures in the system shown in FIG. 1.

The translation processing is executed by a processing sequence shown in, e.g., FIG. 5.

An original sentence (one sentence) serving as a translation processing object is fetched (step a), and is subjected to morphological analysis (step b). In this morphological analysis, morphemes as minimum units constituting a sentence are analyzed, and infection dictionary 5a is utilized during this analysis. In this analysis, a conjugated or inflected word is transferred to its root (fundamental form). For example, a verb expressed in a past tense or by a present or past participal is transferred to its root, and an adjective or adverb expressed in its comparative or superlative degree is transferred to its root.

Translated word and part-of-speed information corresponding to the original words of the original sentence which is analyzed into morphemes as described above is obtained with reference to word dictionary 5b (step c). This processing is executed so that word dictionary 5b is searched using the respective original words as index words.

Syntactic analysis (step e) of the original sentence is executed under the analytic control (step d) according to systactic analysis grammar information 5c. The syntactic analysis is repetitively performed until syntactic analysis of the original sentence is successful under the analytic control. With this analysis, the structure of parts of speech or original words constituting the original sentence, the modification relationship of the parts of speech or a part-of-speech string, or a mode of a tense, and the like are obtained.

Thereafter, the syntactically analyzed structure of the original sentence is transferred to the syntactic structure of a translated sentence using semantic analysis grammar information 5d (step f). More specifically, the syntactic structure of the English sentence (original sentence) is transferred to that of the Japanese sentence (original sentence) with reference to semantic analysis grammar information 5d. If the syntactic structure transfer operation is unsuccessful, it is determined that the syntactic analysis of the original sentence includes an error, and the syntactic analysis is retried.

Translated word possibilities obtained for the respective original words of the original sentence based on the syntactic structure of the translated sentence are reordered according to the surface structure of the translated sentence so as to generate the structure of the translated sentence, thus obtaining a translated sentence possibility corresponding to the original sentence (step g). This processing is called syntactic structure generation processing, and is executed with reference to syntactic generation grammar information 5e.

The translated word possibilities (fundamental forms) constituting the translated sentence possibility are subjected to conjugation and inflection processing in accordance with the syntactic generation results of the original sentence and morphological grammar information 5f to generate morphemes. Thus, the sentence is translated with the appropriate expression in the language of the translated sentence (step h).

In the series of translation processing sequences, a translated sentence corresponding to the original sentence is obtained. When a plurality of translated sentence possibilities are obtained for one original sentence, only one of them is displayed, and a message indicating that other translated sentences are present is preferably displayed, so that the translated sentence to be displayed can be selected by instruction of an operator.

The operation will be described again with reference to FIG. 4. If the input key information is "character key" information (step D), a character code corresponding to the depressed character key is stored in an input buffer (step H), and is stored in memory 2, and its character pattern is displayed on display unit 8 (step I). The respective character patterns of the character codes stored in the input buffer are sequentially displayed, so that an input original sentence consisting of a character string input from input unit 1 is displayed.

If the input key information is "editing key" information (step E), editing processing corresponding to the depressed editing key is executed with respect to the translated sentence (step J). Similarly, if the input key information is "functional key" information (step F), function processing corresponding to the depressed functional key is executed (step K).

If no key information is input, or if key information other than those described above is input, other processing (step L) executed. Other processing includes formation of a hard copy of a translated sentence stored in memory 6 (by printer 9).

With the above operation sequence of controller 3, for example, if an operator depresses some character input keys 1a on the keyboard to input characters, pieces of character information corresponding to the depressed keys are sequentially set in the input buffer to be subjected to translation processing, and are also stored in memory 2 (steps D and H). Then, the input original sentence is displayed on display area 8b of display unit 8 (step I).

At any time during the character input operation, e.g., when the input operation of one sentence is completed, if the operator depresses translation key 1b, translation processing of the original sentence stored in the input buffer is executed in accordance with this key information (steps C and G).

Upon completion of the translation processing, the translated sentence obtained thereby is displayed in area 8c of display unit 8 (steps A and B).

During or after the input operation of the original sentence, if an already-input original sentence must be corrected, cursor control keys 1e are appropriately operated (to enable access to, and correction of the previously input original sentence by means of character input keys 1a) to shift a cursor to a position to be corrected. Then, editing keys 1c including "correction", "insertion", and "deletion" keys are selectively operated to perform the editing processing, e.g., correction, insertion, deletion, and the like.

The editing processing of the translated sentence is similarly performed using function keys 1d. Function keys 1d include a "translated word display key", a "dictionary display key", a "dictionary registration key", a "dictionary deletion key", a "partial translation key", and a "modification key". With the "translated word display key", another translated word possibility of an arbitrary word in the translated sentence (e.g., a word indicated by a cursor) can be displayed. With the "dictionary display key", the content of dictionary section 5 of an arbitrary word in the original sentence (e.g., a word indicated by a cursor) can be displayed. With the "dictionary registration key", an arbitrary word or phrase can be registered in dictionary section 5. With the "dictionary delete key", arbitrary word or phrase of those registered in dictionary section 5 can be deleted from the dictionary. With the "partial translation key", a partial translation, obtained during the translation processing of an original sentence whose translation processing has been unsuccessful, can be displayed as auxiliary information. With the "modification key", a translation possibility of a word or phrase indicated by a cursor by another modification relationship can be displayed as auxiliary information.

The basic operation of the machine translation processing is executed as described above.

In this system, during the translation processing of processor 4, punctuation marks necessary for a translated sentence (including, e.g., a period, a comman, parantheses, quotation marks, a question mark, and the like) are generated, and are inserted at appropriate positions in the translated sentence.

The punctuation marks necessary for the translated sentence include ones corresponding to the punctuation marks in the original sentence and ones unique to the translated sentence. More specifically, if similar punctuation marks are necessary in the translated sentence in correspondence with ones of the punctuation marks in the original sentence, they are generated accordingly, as a matter of course. Even if no corresponding punctuation marks are present in the original sentence, punctuation marks are generated and inserted in the translated sentence in accordance with the syntactic structure of the translated sentence independently of punctuation marks in the original sentence. Note that if punctuation marks corresponding to those in the original sentence are unnecessary in the translated sentence, they are not inserted in the translated sentence.

Figure 6:
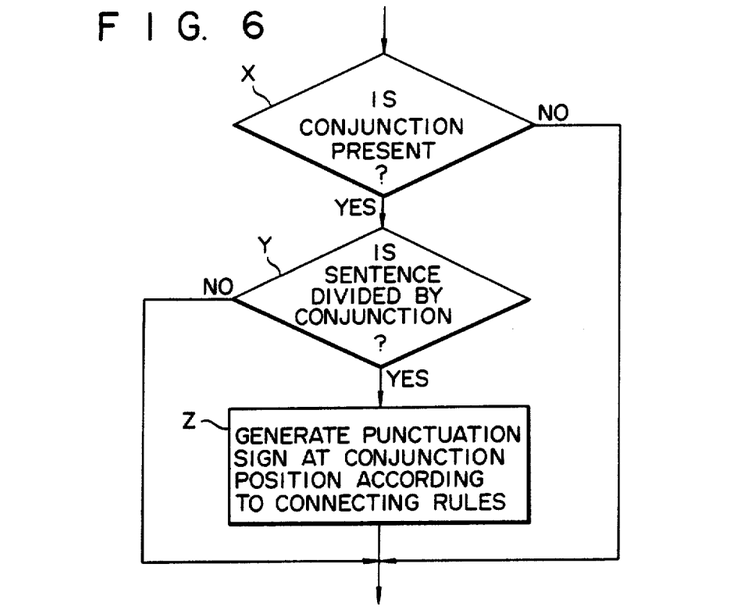
FIG. 6 is a flow chart showing generation procedures of punctuation marks based on a conjunction in the system shown in FIG. 1.

FIG. 6 is a flow chart showing an example of processing for generating punctuation marks in accordance with the syntactic structure of the translated sentence.

In this processing, it is checked in accordance with the syntactic structure of the translated sentence (or original sentence) if a conjunction is present in the translated sentence (or original sentence) (step X). If YES in step X, it is checked if a sentence is meaningfully divided by the conjunction (step Y). If a conjunction which can meaningfully divide a sentence, such as a subordinate conjunction, or a coordinate conjunction, is detected, a punctuation mark is generated in accordance with the connective rules of the translated sentence, and is inserted at the position corresponding to the detected conjunction (step Z).

Figure 7:
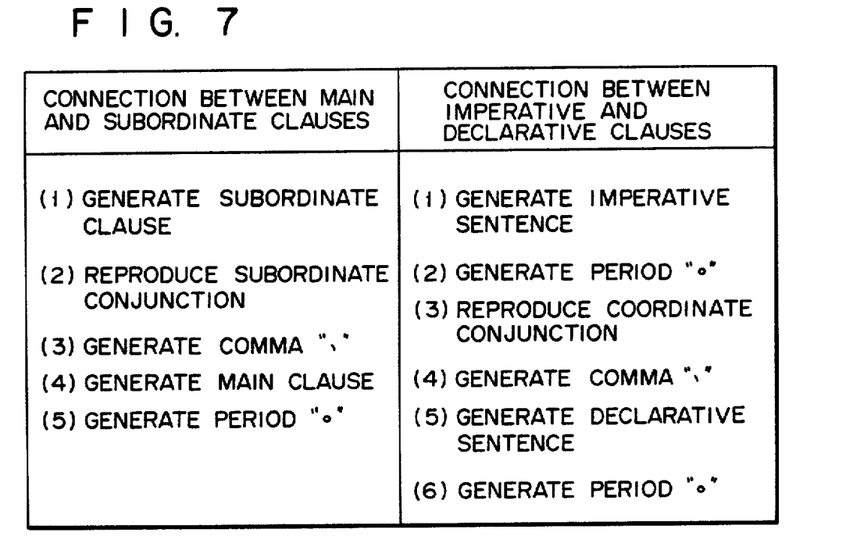
FIG. 7 is a table showing connective rules of sentences which are connected by a conjunction in the system shown in FIG. 1.

Note that the connective rules are provided in accordance with the connective relationship of sentences, as shown in FIG. 7. For example, in the connective rules for connection between a simple sentence serving as a main clause and one serving as a subordinate clause, a subordinate conjunction is reproduced after a subordinate clause is generated, a main clause is generated after a punctuation mark (comma) is generated, and then, a punctuation mark (period) is generated. In the connective rules for connection between coordinate clauses respectively constituting an imperative sentence and a declarative sentence, a punctuation mark (period) is generated after an imperative sentence is generated, a punctuation mark (comma) is generated after a coordinate conjunction is reproduced, and then a punctuation mark (period) is generated after a declarative sentence is generated.

Figure 8A:
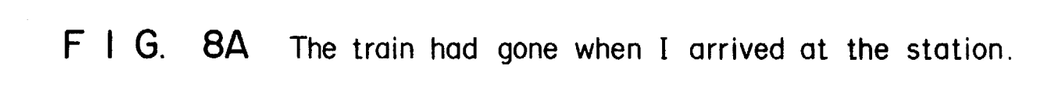
FIGS. 8A to 8C and FIGS. 9A to 9C are charts for explaining two examples of translation processing accompanying generation of punctuation marks in the system shown in FIG. 1.
Figure 8B:
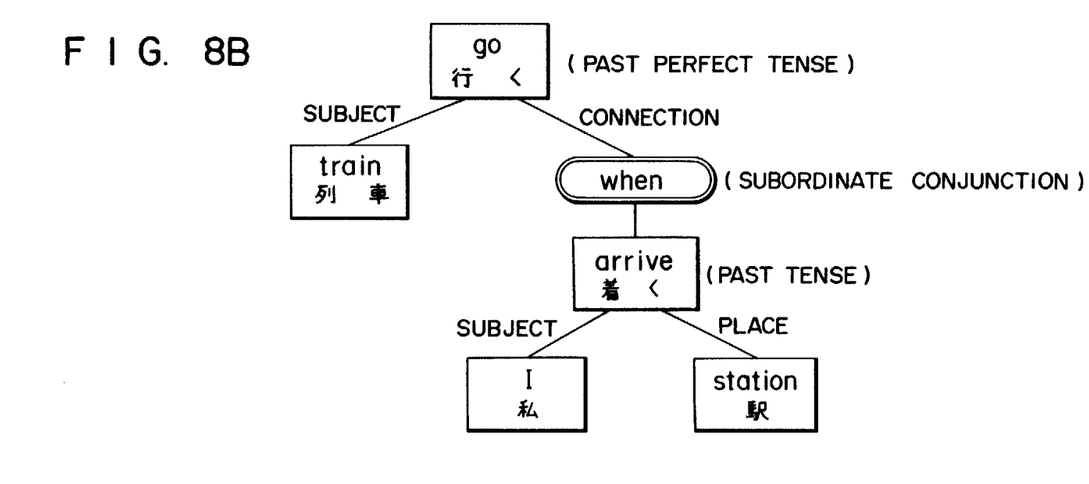

More specifically, when an original sentence which includes a subordinate conjunction between two clauses is subjected to the translation processing, a punctuation mark is generated as follows:

As shown in FIG. 8A, if original sentence "The train had gone when I arrived at the station." is input, this original sentence is subjected to syntactic analysis to obtain the syntactic structure shown in FIG. 8B.

In this case, verb "go (iku)" constitutes a predicate in a main clause, and verb "arrive (tsuku)" constitutes a predicate in a subordinate clause. The word "when" is analyzed as a functional word for subordinately connecting the main and subordinate clauses. Note that pieces of attribute information respectively indicating a past perfect tense and a past tense are added to the analysis results of the verbs.

When a translated sentence is generated from the syntactic structure of an input original sentence, since the word "when" connects the two sentences constituting the main and subordinate clauses to provide the subordinate relationship therebetween, the connective generation rules for connection between main and subordinate clauses shown in FIG. 7 is applied. Translation processing, in this case, is performed as follows:

(1) The subordinate clause is generated as "watashi-ga eki-ni tsuita. (=I arrived at the station)" C1.

(2) The subordinate conjunction is reproduced as "toki (=at the time that)" J1.

(3) Punctuation mark (comma) P1 is added after the conjunction.

(4) A translated sentence of the main clause is generated as "ressha-wa itte-shimatteita. (=the train had gone)" C2.

(5) Punctuation mark (period) P3 is generated.

Figure 8C:
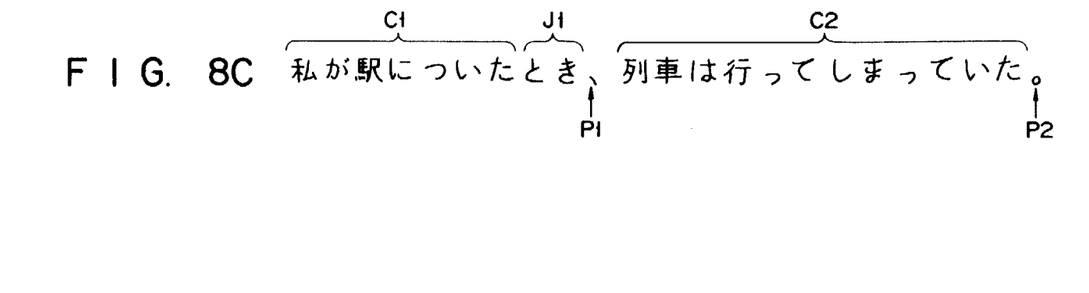

As a result, a translated sentence {C1-J1-P1-C2-P2} (watashi-ga eki-ni tsuita-toki, ressha-wa itte-shimatteita.) is obtained as shown in FIG. 8C.

As the punctuation mark (period) P2 at the end of the sentence, it can be generated in correspondence with the period "." at the end of the original sentence. However, if the position of the period is obtained only from the syntactic analysis of the original sentence, punctuation mark (period) P2 must be added after clause C1. For this reason, processing for inserting an appropriate punctuation mark (period) in an appropriate position in the translated sentence based on the syntactic structure of the translated sentence is necessary.

In this system, since it can be analyzed from a syntactic structure of an original sentence that the original sentence is constituted by a subordinate connection between main and subordinate clauses, appropriate punctuation mark (period) P2 can be provided at an appropriate position in the translated sentence regardless of the position of the punctuation mark (period) in the original sentence.

In addition, punctuation mark (comma) P1 for the translated sentence can be generated and added after a translated word of the subordinate conjunction in accordance with the above-mentioned connective rules.

Therefore, when a translated sentence whose surface structure is different from that of a given original sentence is to be obtained, an appropriate punctuation mark can be added without being influenced by the punctuation mark in the original sentence. Thus, a translated sentence which is easy to read and understand can be obtained.

Figure 9A:
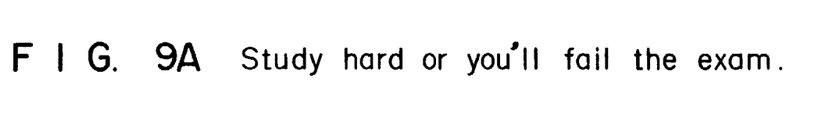
Figure 9B:
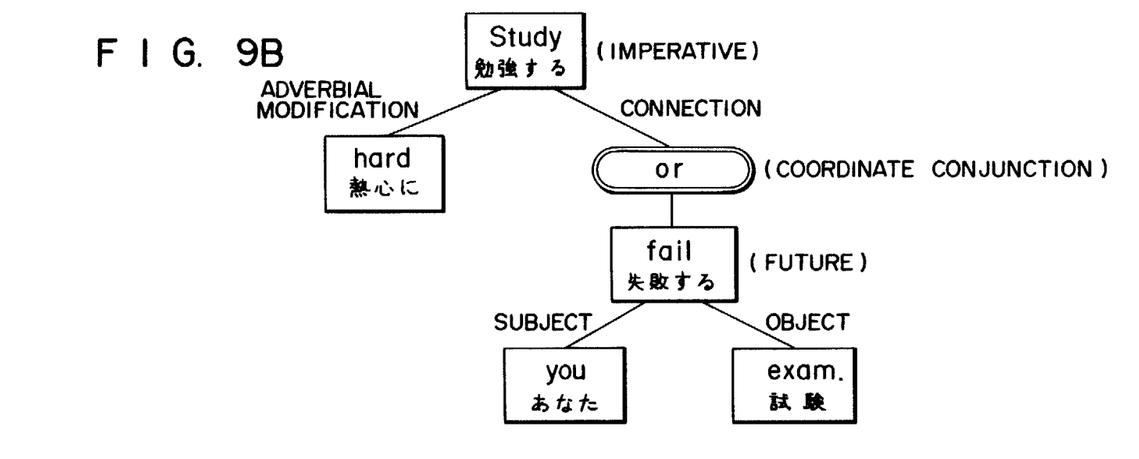

Translation processing of an original sentence consisting of an imperative sentence and a declarative sentence which are connected by a coordinate conjunction will be described with reference to FIGS. 9A to 9C. In this case, as the syntactic analysis result of original sentence "Study hard or you'll fail the exam." shown in FIG. 9A, the syntactic structure shown in FIG. 9B is obtained. In this case, word "study (benkyousuru)" constitutes a predicate in a first sentence, and imperative attribute information is attached to it. Word "fail (shippaisuru)" constitutes a predicate of a second sentence and future attribute information is attached to it. It is analyzed that conjunction "or" coordinately connects an imperative sentence as the first sentence and a declarative sentence as the second sentence. In accordance with this analysis result, the connective generation rules for connection between the imperative and declarative sentences shown in FIG. 7 is applied to perform the translation processing as follows:

(1) First translated sentence S1 constituted by imperative sentence "nesshin-ni benkyou-shinasai (=study hard)" is generated for the first original sentence.
(2) Punctuation mark (period) P3 for translated sentence S1 of the first original sentence is generated.
(3) Conjunction "or" is reproduced to obtain translated word, e.g., "samonaito (=otherwise)" J2.
(4) Punctuation mark (comma) P4 is added after conjunction J2.
(5) Second translated sentence S2 constituted by declarative sentence "anata-wa shiken-ni shippaisurudeshou (=you'll fail the exam)" is generated for the second original sentence connected by conjunction J2.
(6) Punctuation mark (period) P3 is added after the second translated sentence.

Figure 9C:
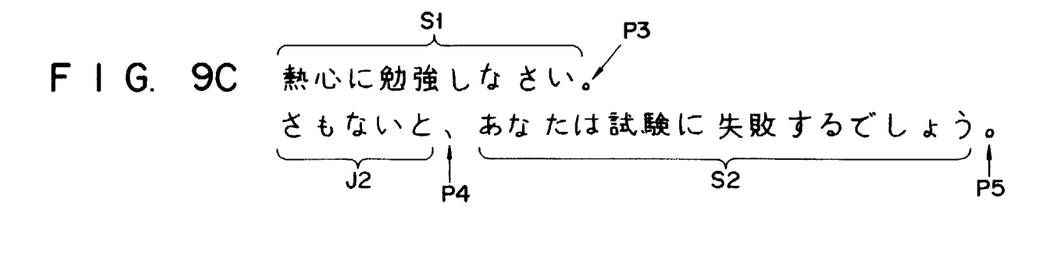

As a result, as shown in FIG. 9C, translated sentence {S1-P3/J2-P4-S2-P5} (nesshin-ni benkyoushinasai. samonaito, anata-wa shiken-ni shippaisurudeshou.) with appropriate punctuation marks can be obtained. In this case, one sentence including conjunction "or" in the original sentence is divided into two sentences in accordance with its connective relationship, and punctuation marks P3 and P4 which are not present in the original sentence are generated to generate the translated sentence consisting of two sentences.

Figure 10:
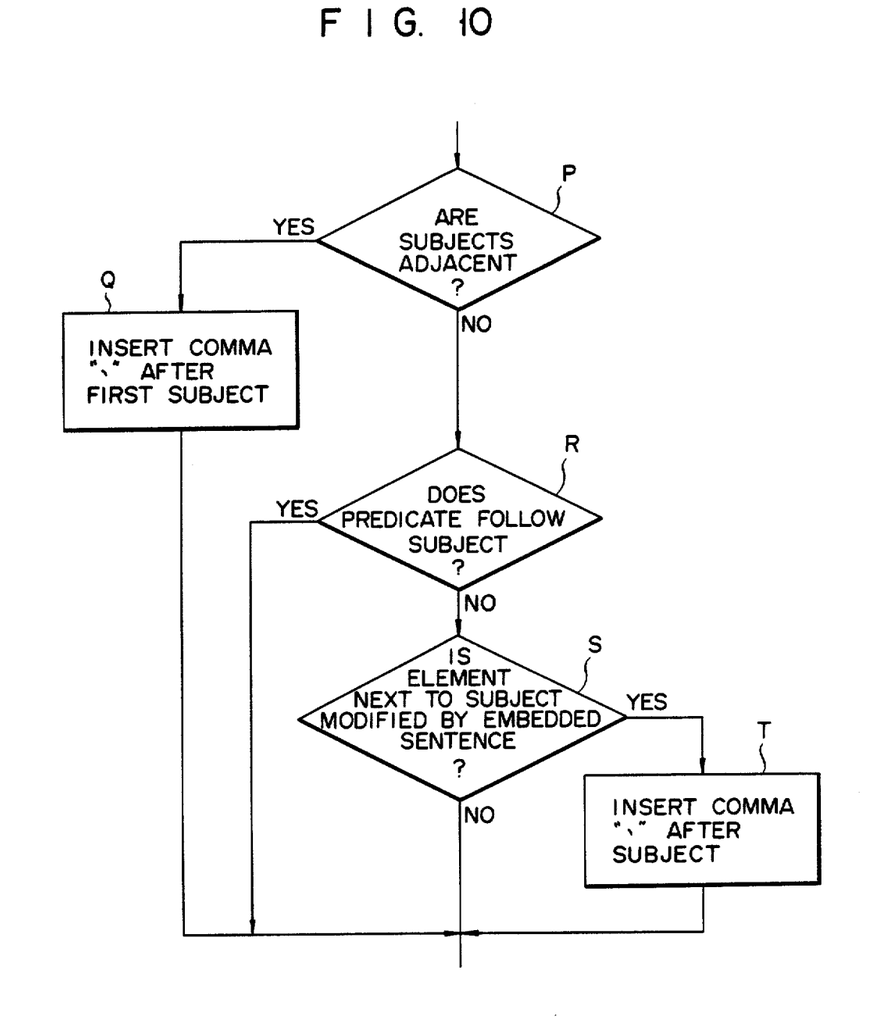
FIG. 10 is a flow chart showing insertion procedures for a comma, with respect to a translated sentence in the system shown in FIG. 1.

FIG. 10 shows procedures for generating a new punctuation mark from a phrase string in a translated sentence and inserting it in the translated sentence.

More specifically, in this processing, it is checked from the structure of phrases in the translated sentence if subjects are adjacent to each other (step P). If YES in step P, a comma is inserted as a punctuation mark immediately after the first subject (step Q). If an element other than a predicate follows a subject (step R), it is checked if the element is modified by an embedded sentence (step S). If YES in step S, a comma is inserted as a punctuation mark immediately after the subject (step T).

Figures 11A, 11B:
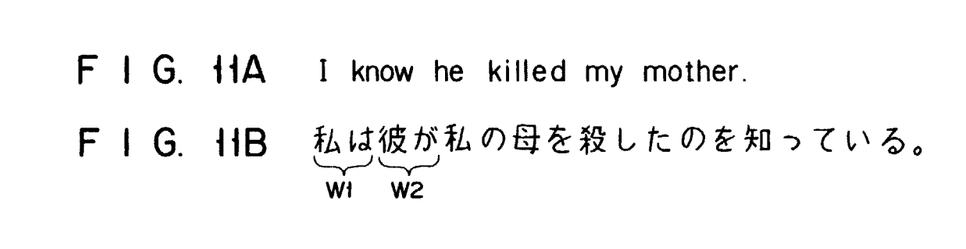
FIGS. 11A to 11C and 12A to 12C are charts for explaining two other examples of translation processing accompanying generation of punctuation marks in the system shown in FIG. 1.
Figure 11C:
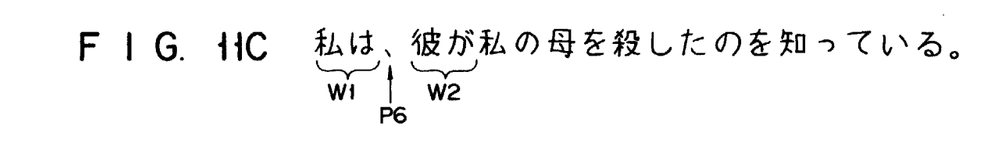

More specifically, a comma is inserted as follows. For example, when original sentence "I know he killed my mother" shown in FIG. 11A is subjected to translation processing and translated sentence (watashi-wa kare-ga watashi-no haha-wo koroshita-nowo shitteiru.) shown in FIG. 11B is obtained, it is detected by the above-mentioned procedures that two subjects "watashi-wa (=I)" W1 and "kare-ga (he)" W2 are adjacent to each other. Thus, with above-mentioned steps P and Q, comma P6 is inserted immediately after first subject W1 to complete the translated sentence shown in FIG. 11C.

Figures 12A, 12B, 12C:
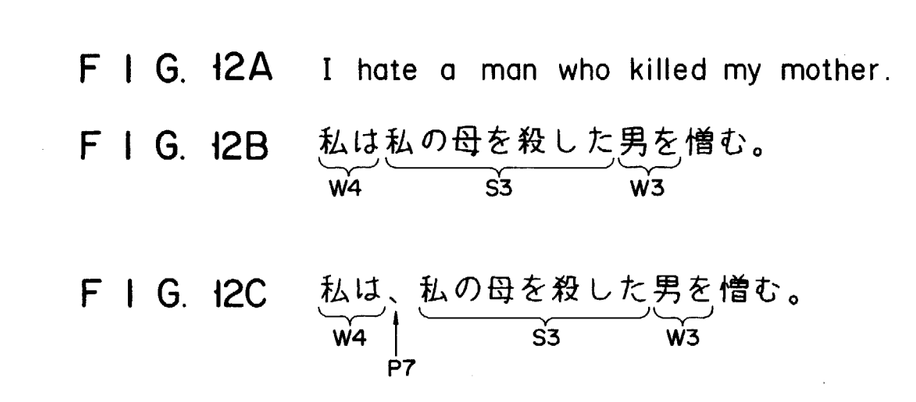

When translated sentence (watashi-wa watashi-no haha-wo koroshita otoko-wo nikumu.) shown in FIG. 12B is obtained from original sentence "I hate a man who killed my mother." shown in FIG. 12A, since word "otoko-wo (=man)" W3 is modified by embedded sentence "watashi-no haha-wo koroshita (=who killed by mother)" S3 in steps, comma P7 is inserted immediately after subject "watashi-wa (=I) to complete the translated sentence as shown in FIG. 12C.

If no punctuation mark is included in an original sentence (English sentence), a comma is inserted in a translated sentence (Japanese sentence) in accordance with its semantic structure, so that a translated sentence which is easy to understand can be obtained.

Therefore, when a sentence translated into Japanese has a verbal expression structure quite different from that of the original English, a translated sentence with appropriate punctuation, which is easy to read and understand can be effectively obtained.

In the system of the present invention, translation processing is executed by applying rules according to the nature of a translated sentence's language on the basis of the syntactic structure of an original language sentence and the positional relationship of words, phrases, and clauses in a translated sentence. Therefore, a punctuation mark which is appropriate in a translated sentence is generated independently of a punctuation mark present in an original language sentence, and is inserted at an appropriate position, thus generating a translated sentence.

Therefore, a natural-sounding translated sentence including a punctuation mark at an appropriate position can be generated. In addition, since punctuation in a translated sentence is generated independently of that in an original sentence, appropriate punctuation can be generated regardless of an original sentence whose surface structure is different from that of the translated sentence. For this reason, a translated sentence which is easy to read and understand can be obtained, resulting in great practical effects.

The present invention is not limited to the above embodiment. In the above embodiment, translation from English to Japanese has been explained. However, the present invention can be applied to translation from Japanese to English, and can also be applied to translation processing of other languages. As a simple system for generating a punctuation mark in a translated sentence when an original sentence has no corresponding punctuation sign, a punctuation mark corresponding to that which should be used in the language of a translated sentence can be inserted in a translated sentence. To summarize, appropriate punctuation can be inserted in a translated sentence regardless of the verbal expression structure of an original sentence. Various other changes and modifications may be made within the spirit and scope of the invention.

What is claimed is:

1. A machine translation system comprising input means for inputting an original sentence, dictionary means for storing language information used in translation processing, translation processing means for translating the original sentence input through said input means with reference to the language information stored in said dictionary means, and output means for outputting a translated sentence obtained by said translation processing means, said translation processing means including analysis means for analyzing the original sentence syntactically and semantically using both a syntactic analysis grammar and a semantic analysis grammar, translated sentence generation means for generating the translated sentence using both a syntactic generation grammar and a morphological grammar in accordance with an analysis result from said analysis means, and punctuation mark generation means for generating an appropriate punctuation mark based on at least one of the analyzed structure of the original sentence and the structure of the translated sentence substantially independently of a punctuation mark present in the original sentence during a translated sentence generation process of said translated sentence generation means, and inserting the generated punctuation mark in the translated sentence.

2. A system according to claim 1, wherein said analysis means includes syntactic analysis means for analyzing a syntactic structure of the original sentence, and said punctuation mark generation means includes punctuation mark setting means for setting a type and position of the punctuation mark in the translated sentence in accordance with the syntactic structure of the original sentence obtained by said syntactic analysis means.

3. A system according to claim 2, wherein said syntactic analysis means includes connective structure analyzing means for analyzing a connective structure of the original sentence, and said punctuation mark setting means includes appropriately setting means for appropriately setting the type and position of the punctuation mark in the translated sentence in accordance with the connective structure.

4. A system according to claim 2, wherein said syntactic analysis means includes modification structure analyzing means for analyzing a modification structure of the original sentence, and said punctuation mark setting means includes appropriately setting means for appropriately setting the type and position of the punctuation mark in the translated sentence in accordance with the modification structure.

5. A system according to claim 2, wherein said syntactic analysis means includes connective and modification structure analyzing means for analyzing connective and modification structures of the original sentence, and said punctuation mark setting means includes appropriately setting means for appropriately setting the type and position of the punctuation mark in the translated sentence in accordance with the connective and modification structures.

6. A system according to claim 1, wherein said translated sentence generation means includes syntactic structure generation means for generating a syntactic structure of the translated sentence, and said punctuation mark generation means includes punctuation mark setting means for setting a type and position of the punctuation mark in the translated sentence in accordance with the syntactic structure of the translated sentence.

7. A system according to claim 6, wherein said punctuation mark setting means includes appropriately setting means for appropriately setting the type and position of the punctuation mark in the translated sentence in accordance with the connective structure of the translated sentence.

8. A system according to claim 6, wherein said punctuation mark setting means includes appropriately setting means for appropriately setting the type and position of the punctuation mark in the translated sentence in accordance with the modification structure of the translated sentence.

9. A system according to claim 6, wherein said punctuation mark setting means includes appropriately setting means for appropriately setting the type and position of the punctuation mark in the translated sentence in accordance with the connective and modification structures of the translated sentence.

10. A system according to claim 1, wherein said translated sentence generation means includes semantic discrimination means for discriminating a predetermined semantic structure of the translated sentence, and said punctuation mark generation means includes punctuation mark setting means for appropriately setting a type and position of the punctuation mark in the translated sentence in accordance with the semantic structure of the translated sentence.

* * * * *